Figures 1, 2, 3, 4:
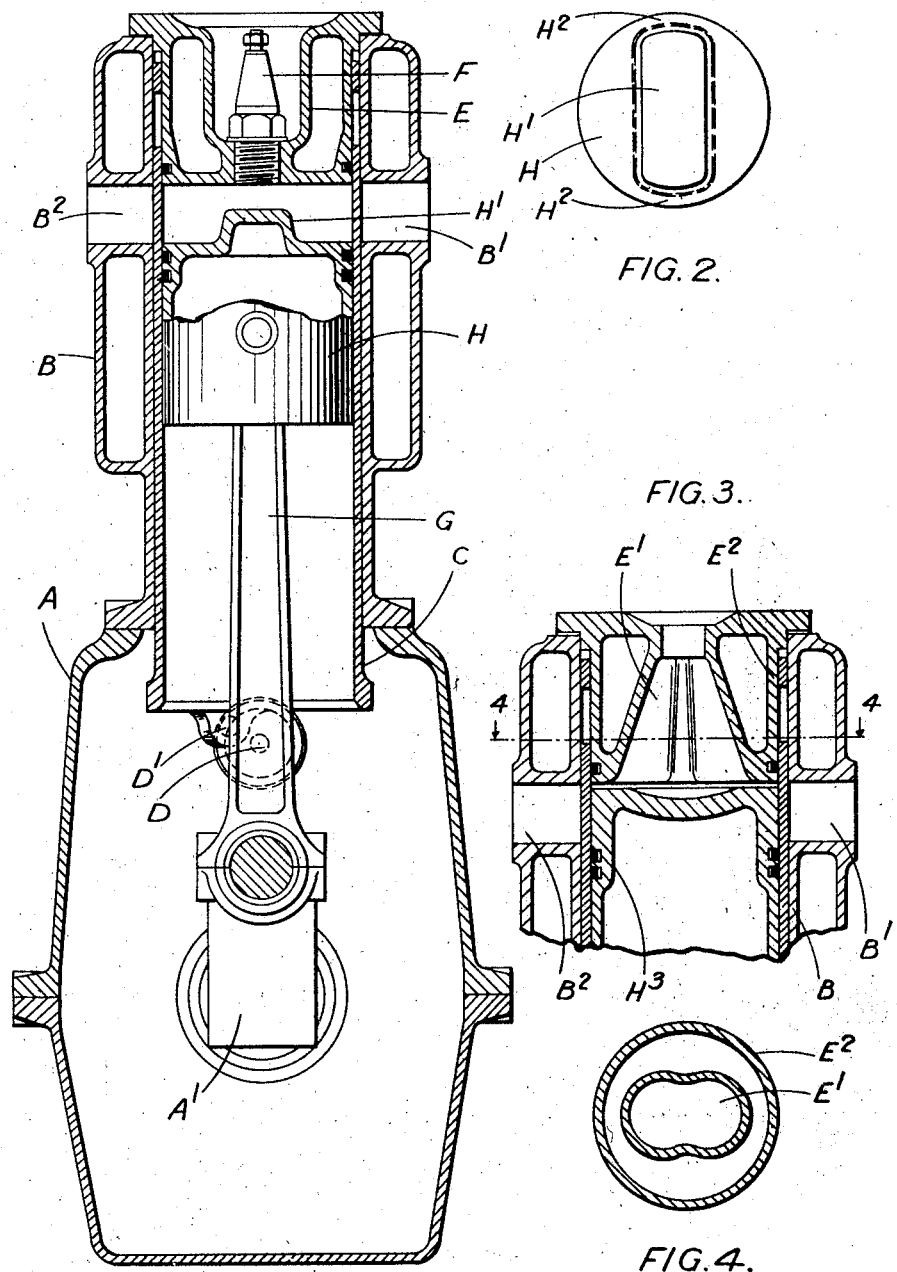

June 18, 1929.  H. R. RICARDO  1,718,076

SLEEVE VALVE INTERNAL COMBUSTION ENGINE

Filed July 20, 1928

INVENTOR
Harry R. Ricardo

Patented June 18, 1929.

1,718,076

UNITED STATES PATENT OFFICE.

HARRY RALPH RICARDO, OF LONDON, ENGLAND.

SLEEVE-VALVE INTERNAL-COMBUSTION ENGINE.

Application filed July 20, 1928, Serial No. 294,267, and in Great Britain August 18, 1927.

This invention relates to four-cycle internal combustion engines of the type in which the inlet and exhaust ports are controlled by a single sleeve valve having a combined oscillating and reciprocating motion, and has for its object to render the combustion in this type of engine more efficient.

In engines of this type the cylinder charge, during combustion, is in rapid rotation about the cylinder axis owing to the lateral opening of the inlet ports which imparts to the entering charge a tangential motion. This rotation or "swirl" is of very little value for distributing the flame and if excessive, it gives trouble through excessive heat loss and centrifugal separation of the liquid fuel in the charge.

According to the present invention, the combustion chamber is so formed as to impede the swirl, and thus slow it down, during the compression stroke, to the desired figure. The most convenient method of retarding the swirl, is to form the combustion chamber so that the whole, or a substantial part thereof, has a non-circular section about the cylinder axis. Where, as is common, the combustion chamber is of conical, frustro-conical, or cylindrical shape, and is carried mainly within the cylinder head pot, it may be formed with a cross-section lobed (e. g. "clover-leaf") or polygonal. In another type of combustion chamber, which is carried mainly between the head and the piston, being bounded at the sides by the sleeve walls, either the cylinder head or the piston crown may be of sloping, stepped or other irregular form, adapted to reduce the swirl. In certain cases it may be desirable to use both methods in combination, as for example the combination with a lobed cylinder head with a stepped piston.

The step or steps on the piston or head should be otherwise than circular or concentric with the cylinder axis, for example a transversely extending projecting part may be provided, the ends of this projection stopping short of the circumferential periphery of the piston if the projection is mounted thereon, or being paired off so as to leave clearance for the flow of gas from or to the ports. If mounted on the cylinder head, there may be for example two transverse projections spaced apart and having a transverse recess between them.

Various constructional forms may be adopted in accordance with this invention but two alternative arrangements according to this invention are illustrated by way of example in the accompanying drawings, in which Figure 1 is a sectional side elevation in a plane at right angles to the crankshaft axis of one construction of internal combustion engine according to this invention, Figure 2 is a plan view of the piston employed in the construction illustrated in Figure 1, Figure 3 is a sectional side elevation of the upper part of the cylinder and the cylinder head of an alternative form of internal combustion engine according to this invention, and Figure 4 is a section through the cylinder head on the line 4—4 of Figure 3.

In the construction illustrated in Figures 1 and 2, the engine comprises a crank case A in which is mounted a crankshaft $A^1$. Supported on the crank case A is a water-cooled cylinder B within which is mounted a sleeve valve C. The sleeve valve C which controls inlet and exhaust ports $B^1$, $B^2$ in the cylinder wall has a combined oscillating and reciprocating motion imparted thereto in known manner by a crank pin $D^1$ carried by a lay shaft indicated at D which is driven through suitable gearing from the crankshaft $A^1$.

The outer end of the cylinder B is closed by a plug-like water-cooled cylinder head E which extends into the upper end of the sleeve C and carries a sparking plug F.

As so far described the engine is of known form.

Reciprocating within the sleeve C and operatively connected to the crankshaft $A^1$ by a connecting rod G is a piston H which according to the constructional form of the invention now being described is provided with a radial rib or projection $H^1$ on its face which tends to impede the rotational motion of the charge about the cylinder axis. This rib conveniently does not extend completely across the piston face so as to make contact at its ends with the sleeve but is only of such length as to leave a small space $H^2$ between each of its ends and the edge of the piston face as shown in Figure 2.

In the alternative construction illustrated in Figures 3 and 4 the general construction of the engine would be similar to that shown in Figures 1 and 2. In the construction illustrated in Figures 3 and 4, however, the combustion chamber $E^1$ is formed mainly in a plug-like cylinder head E² and considered in sectional elevation is of substantially conical form as shown in Figure 3 while the face of the piston H³ is substantially flat or slightly concave as shown. In this construction in order to impede excessive rotational motion of the charge about the combustion chamber axis, the combustion chamber is of non-circular form in cross-section and in the construction illustrated is of two-lobed form as shown in Figure 4. Alternatively it may be of three or four-lobed form, polygonal or of other symmetrical but non-circular cross-section adapted to impede rotational motion of the charge about the cylinder axis.

It is to be understood, however, that the constructions described above are given by way of example only and that the form of the combustion chamber may vary considerably without departing from the present invention.

What I claim as my invention and desire to secure by Letters Patent is:—

1. An internal combustion engine including in combination a cylinder, a sleeve valve disposed within the cylinder and controlling inlet and exhaust ports in the cylinder wall, means for imparting to the sleeve valve a combined oscillating and reciprocating motion of which both components combine in the control of the ports by the sleeve valve and tend to cause the inflowing gaseous charge to rotate in the cylinder about the cylinder axis, a piston reciprocating within the sleeve valve, and a combustion chamber a part of which constitutes an obstruction to rotational motion of the charge about the cylinder axis.

2. An internal combustion engine including in combination a cylinder, a sleeve valve disposed within the cylinder and controlling inlet and exhaust ports in the cylinder wall, means for imparting to the sleeve valve a combined oscillating and reciprocating motion of which both components combine in the control of the ports by the sleeve valve and tend to cause the inflowing gaseous charge to rotate in the cylinder about the cylinder axis, a piston reciprocating within the sleeve valve, and a combustion chamber bounded by the sleeve valve wall, the cylinder head and the piston face, and having a part of such boundary formed to constitute an obstruction to rotational motion of the charge about the combustion chamber axis.

3. An internal combustion engine including in combination a cylinder, a sleeve valve disposed within the cylinder and controlling inlet and exhaust ports in the cylinder wall, means for imparting to the sleeve valve a combined oscillating and reciprocating motion of which both components combine in the control of the ports by the sleeve valve and tend to cause the inflowing gaseous charge to rotate in the cylinder about the cylinder axis, a piston reciprocating within the sleeve valve, and a combustion chamber having a part with a formation other than circular which will impede rotational motion of the charge in the combustion chamber.

4. An internal combustion engine including in combination a cylinder, a sleeve valve disposed within the cylinder and controlling inlet and exhaust ports in the cylinder wall, means for imparting to the sleeve valve a combined oscillating and reciprocating motion both components of such motion combining in the control of the ports by the sleeve valve, and a piston reciprocating within the sleeve valve, the formation of at least one wall of the combustion chamber bounded by the piston, sleeve and cylinder head, being such as to impede rotational motion of the charge about the combustion chamber axis.

5. An internal combustion engine including in combination a cylinder, a sleeve valve disposed within the cylinder and controlling inlet and exhaust ports in the cylinder wall, means for imparting to the sleeve valve a combined oscillating and reciprocating motion both components of such motion combining in the control of the ports, a plug-like cylinder head extending into the outer end of the sleeve and containing a combustion chamber at least one part of which is of non-circular cross-section in a plane at right angles to the cylinder axis, and a piston reciprocating within the sleeve valve.

6. An internal combustion engine including in combination a cylinder, a sleeve valve disposed within the cylinder and controlling inlet and exhaust ports in the cylinder wall, means for imparting to the sleeve valve a combined oscillating and reciprocating motion both components of which motion combine to control the ports, a plug-like cylinder head extending into the outer end of the sleeve and containing a combustion chamber the cross-section of which in a plane at right angles to the cylinder axis is of lobed formation, and a piston reciprocating within the sleeve valve.

In testimony whereof I have signed my name to this specification.

HARRY RALPH RICARDO.